P. ENGLISH.
GAS ENGINE STARTER.
APPLICATION FILED MAR. 28, 1912.
1,044,366.
Patented Nov. 12, 1912.
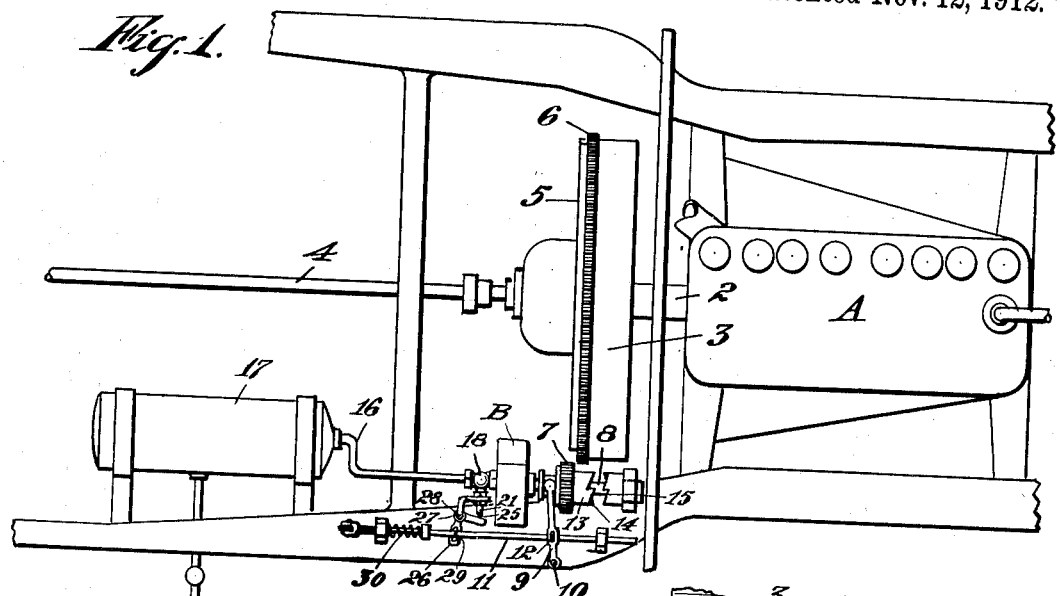
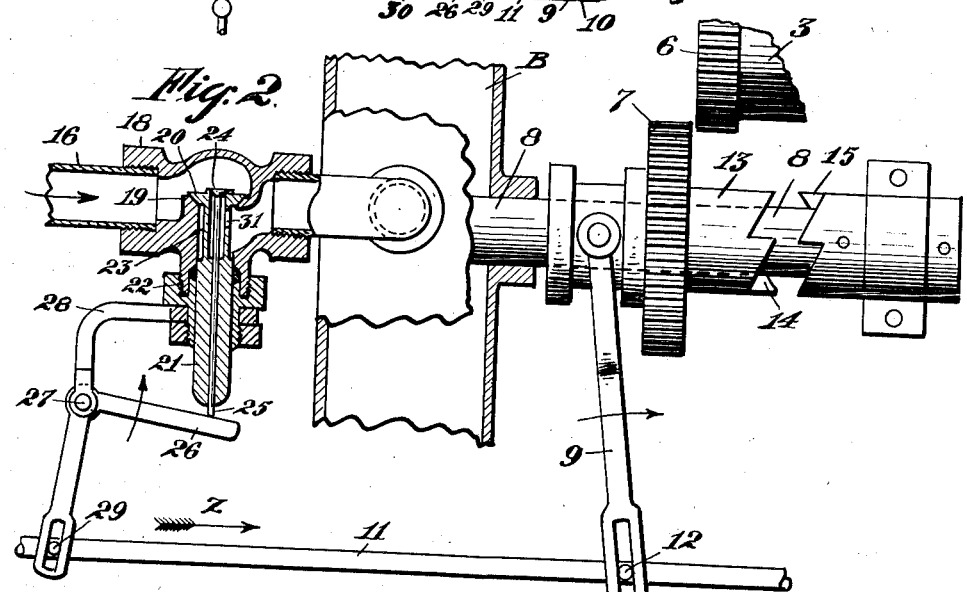
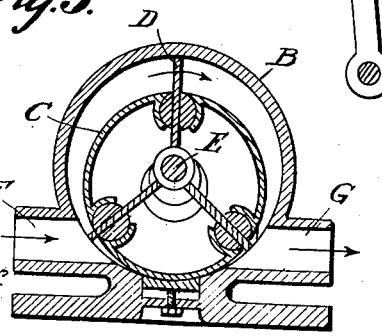
Witnesses:
R. L. Berry
Thos. Castberg
Inventor
Peter English
By G. H. Strong.
Atty.

UNITED STATES PATENT OFFICE.

PETER ENGLISH, OF SAN FRANCISCO, CALIFORNIA, ASSIGNOR, BY MESNE ASSIGNMENTS, TO THE ENGLISH COMPANY, A CORPORATION OF MICHIGAN.

GAS-ENGINE STARTER.

1,044,366.      Specification of Letters Patent.     Patented Nov. 12, 1912.

Application filed March 28, 1912. Serial No. 686,850.

*To all whom it may concern:*

Be it known that I, PETER ENGLISH, citizen of the United States, residing in the city and county of San Francisco and State of California, have invented new and useful Improvements in Gas-Engine Starters, of which the following is a specification.

This invention relates to a starter for gas engines and the like, and particularly pertains to a fluid pressure operated starter and means for controlling same.

It is the object of this invention to provide a simple and efficient starter for gas engines and the like, which is adapted to be operated by fluid pressure; and to provide a means for controlling the flow of the propelling fluid to the starter which prevents shock and jar, and thereby obviates wear and tear on the engine and the connecting parts.

The purpose of this invention is to provide a gas engine starter which will do away with the cranking operation now commonly employed, and by means of which the engine can be started by the operating of a valve.

The invention consists of the parts and the construction and combination of parts as hereinafter more fully described and claimed, having reference to the accompanying drawings, in which—

Figure 1 is a plan view of the invention as applied. Fig. 2 is a detail view of the invention partly in section and partly in elevation. Fig. 3 is a detail vertical section of a fluid pressure motor employed in this invention.

In the drawings A represents a gas engine of any suitable construction; 2 indicates the drive-shaft having a fly-wheel 3 thereon; and 4 represents a propeller shaft designed to be connected to the engine shaft 2 by means of a clutch member 5, which clutch member engages the fly-wheel 3 in the manner common in automobile construction. Formed on the periphery of the fly-wheel 3 are gear teeth 6 which are designed to be engaged by a shiftable pinion 7, loosely mounted on a shaft 8 disposed at right angles to the fly-wheel 3 adjacent to the periphery thereof. The pinion 7 is slidable longitudinally on the shaft 8 so that it may be thrown in and out of engagement with the gear teeth 6 on the fly-wheel 3, as may be desired and as will be later described. The shifting of the pinion 7 is accomplished by means of a lever arm 9, pivotally mounted at 10, the outer end of which terminates in a yoke which engages a grooved hub on the pinion 7 in the manner common in gear shift mechanisms. The lever arm 9 is rocked by means of a reciprocable rod 11 which is connected to the arm 9 by means of a pin 12 in the rod 11 engaging a slot in the arm 9 or in any other suitable manner. Mounted on the pinion 7 is a hub 13, the outer end of which terminates in clutch teeth 14 which are designed to be engaged with, and disengaged from similar clutch teeth 15 formed on a collar rigidly mounted on the shaft 8.

The shaft 8 is the drive-shaft of a fluid pressure motor, indicated at B, which may be of any suitable type or construction, but the form shown in Fig. 3 is preferably employed. This motor comprises a circular casing, an eccentric disk C therein mounted on the shaft 8, and a series of blades or vanes D revolubly mounted on a stud E concentric with the shaft 8 and the casing B; inlet and outlet passages F and G respectively being formed in the casing B for the admission and discharge of fluid under pressure by which the blades D, disk C and the shaft 8 are rotated. The inlet passage F connects with a conduit 16, leading from a reservoir 17 containing air or gas under pressure, and disposed in the conduit 16 is a normally closed cut-off valve of peculiar construction. This valve consists of a casing 18 formed with a valve seat 19 in which a tapered disk valve 20 is adapted to seat; the valve 20 being carried on a stem 21 which extends through a gland 22 on the valve casing 18 and is reciprocable therein. The valve stem 21 is formed with a chamber 23 in its inner end which communicates with the pressure side of the valve 20 and is normally closed thereto by means of an auxiliary disk valve 24 which seats on the valve 20; a stem 25 on the auxiliary valve 24 extending longitudinally through the stem 21 and is reciprocable therein. The outer end of the valve stem 25 projects a short distance beyond the outer end of the stem 21 and is positioned to be in the path of travel of one arm of a bell-crank lever 26, fulcrumed at 27 on a bracket 28 mounted on the valve casing 18. The outer end of the other arm of the bell-crank lever 26 is connected to the rod 11 by means of a pin 29 in the latter which engages a slot in the former.

A spring 30 on the rod 11 normally retains the rod in such position as to hold the pinion 7 out of mesh with the gear teeth 6 on the fly-wheel 3, and to hold the bell-crank lever 26 in such position that the valve 24 will rest in its seat.

An opening 31 is formed in the valve stem 21 so as to provide communication between the chamber 23 and the unloaded side of the valve 20 leading to the motor B, the purpose of which will be presently described.

In the operation of the invention, when it is desired to set the crank-shaft 2 of the engine A in motion, the rod 11 is reciprocated by hand or in any suitable manner in opposition to the spring 30 in the direction of the arrow $z$ in Fig. 2. This action rocks the bell-crank lever 26 and the lever arm 9 in the direction indicated by the arrows thereon in Fig. 2. The lever arm 9 acts to advance the pinion 7 on the shaft 8 toward the gear teeth 6 on the fly-wheel 3, while the initial movement of the bell-crank lever 26 reciprocates the auxiliary valve stem 25 so as to unseat the valve 24 and open communication between the chamber 23 and the pressure side of the valve 20. This action allows a small quantity of air under pressure from the reservoir 17 to pass through the pipe 16, valve casing 18, chamber 23 and through the perforation 30 into the motor B through the inlet passage F.

The amount of air admitted to the motor B by the opening of the valve 24 is sufficient to cause the motor to rotate slowly, thereby transmitting a slow rotary motion to the shaft 8, which motion in turn is communicated to the pinion 7 by the frictional engagement of the latter with the shaft 8. The rotation of the pinion 7 continues until the teeth of the pinion are in alinement with the spaces between the gear wheel 6 on the fly-wheel 3, whereupon the pinion 7 will be moved forward on the shaft 8 into mesh with the gear teeth 6 by the action of the lever arm 9. The continued movement of the pinion 7 on the shaft 8 throws the clutch teeth 14 on the hub 13 into engagement with the clutch teeth 15 carried on the shaft 8. The moment this occurs, the bell-crank lever 26 will engage the valve stem 21 so as to reciprocate the latter and unseat the valve 20 so that a sufficient quantity of air will be delivered from the reservoir 17 to the motor B to cause the latter to rotate at high speed. This causes the shaft 8 to quickly revolve and transmit its motion to the pinion 7 through the clutch members 15 and 14. The pinion 7 being meshed with the teeth 6 on the fly-wheel 3 will cause the latter to rotate, thereby revolving the crank-shaft 2 and setting the engine A in motion in the usual manner. This being done, the rod 11 is released and is restored to its normal position by means of the spring 30, thereby closing the valves 24 and 20 and withdrawing the pinion 7 out of engagement with the gear teeth 6 on the fly-wheel 3.

The clutch teeth 15 and 14 are so shaped that when the fly-wheel 3 is revolved through the crank-shaft 2 from the engine A at a higher speed than that given the fly-wheel 3 through the motor B, the teeth 14 will be caused to ride over the clutch teeth 15 and the pinion 7, will be disengaged by the increased speed of the fly-wheel 3 acting thereon, so as to throw the teeth 14 out of engagement with the teeth 15. This action assists in restoring the pinion 7 to its normal position out of engagement with the gear teeth 6 of the fly-wheel 3, as shown in Fig. 2, in readiness for another operation.

It is manifest that the gear teeth 5 may be formed on the propeller shaft 4, if desired, and they may be mounted on or carried by the crank-shaft 2 direct, but the construction here shown is preferred as a great leverage may be obtained without the use of large gears, other than that formed on the fly-wheel, thereby rendering the apparatus compact.

The important feature of this invention lies in giving the pinion 7 a slow preliminary movement on its engagement with the gear teeth 6 prior to the engagement of the clutch teeth thereon with the clutch 15 on its drive-shaft 8, thus insuring the intermeshing of the pinion 7 with the teeth 6 before the maximum of power is delivered to the pinion 7; the clutch teeth 14 and 15 engaging before the valve 20 controlling the maximum flow of air under pressure from the reservoir 17 is opened.

Having thus described my invention, what I claim and desire to secure by Letters Patent is—

1. A gas engine starter, the combination with the fly-wheel of the engine, of gear teeth formed thereon, a fluid pressure motor, a drive-shaft rotatable thereby, a loose pinion shiftable on said shaft and engageable with the gear teeth on the engine fly-wheel, a clutch member carried on said pinion, a clutch member on said drive-shaft, and means for simultaneously throwing the pinion into mesh with the gear teeth, the clutch members into engagement with each other and setting the motor in operation.

2. A gas engine starter, the combination with the fly-wheel of the engine, of gear teeth formed thereon, a fluid pressure motor, a drive-shaft rotatable thereby, a loose pinion shiftable on said shaft and engageable with the gear teeth on the engine fly-wheel, a clutch member carried on said pinion, a clutch member on said drive-shaft, means for simultaneously throwing the pinion into mesh with the gear teeth, the clutch members into engagement with each other and setting the motor in operation, and means for giving the pinion a slow rotary motion preliminary to its engagement with the gear teeth.

3. A gas engine starter, the combination with the fly-wheel of the engine, of gear teeth formed thereon, a fluid pressure motor, a drive-shaft rotatable thereby, a loose pinion shiftable on said shaft and engageable with the gear teeth on the engine fly-wheel, a clutch member carried on said pinion, a clutch member on said drive-shaft, means for shifting the pinion into mesh with the gear teeth and for throwing the clutch members together, and means for giving the pinion a slow initial rotary movement preliminary to its engagement with the gear teeth.

4. A gas engine starter, the combination with the fly-wheel of the engine, of gear teeth formed thereon, a fluid pressure motor, a drive-shaft rotatable thereby, a loose pinion shiftable on said shaft and engageable with the gear teeth on the engine fly-wheel, a clutch member carried on said pinion, a clutch member on said drive-shaft, means for shifting the pinion into mesh with the gear teeth and for throwing the clutch members together, and means for giving the pinion a slow initial rotary movement preliminary to its engagement with the gear teeth, including an auxiliary valve controlling the flow of fluid pressure to the motor.

5. A gas engine starter, the combination with the fly-wheel of the engine, of gear teeth formed thereon, a fluid pressure motor, a drive-shaft rotatable thereby, a loose pinion shiftable on said shaft and engageable with the gear teeth on the engine fly-wheel, a clutch member carried on said pinion, a clutch member on said drive-shaft, means for shifting the pinion into mesh with the gear teeth and for throwing the clutch members together, means for giving the pinion a slow initial rotary movement preliminary to its engagement with the gear teeth, including an auxiliary valve controlling the flow of fluid pressure to the motor, means for operating said auxiliary valve simultaneous with the shifting of the pinion, a main valve, and means whereby the main valve is opened when the pinion is immeshed with the gear teeth and the clutch members are engaged.

6. A gas engine starter, the combination with the fly-wheel of the engine, of gear teeth formed thereon, a fluid pressure motor, a drive-shaft rotatable thereby, a loose pinion shiftable on said shaft and engageable with the gear teeth on the engine fly-wheel, a clutch member carried on said pinion, a clutch member on said drive-shaft, means for shifting the pinion into mesh with the gear teeth and for throwing the clutch members together, means for giving the pinion a slow initial rotary movement preliminary to its engagement with the gear teeth including an auxiliary valve controlling the flow of fluid pressure to the motor, means for operating said auxiliary valve simultaneous with the shifting of the pinion, a main valve, means whereby the main valve is opened when the pinion is immeshed with the gear teeth and the clutch members are engaged, and means for closing the valves and restoring the pinion and the clutch thereon in their normally disengaged positions.

In testimony whereof I have hereunto set my hand in the presence of two subscribing witnesses.

PETER ENGLISH.

Witnesses:
WALTER REIMERS,
GENEVIEVE S. DONELIN.